(Model.)
N. NILSON.
SPRING TOOTH FOR AGRICULTURAL IMPLEMENTS.
No. 280,072. Patented June 26, 1883.
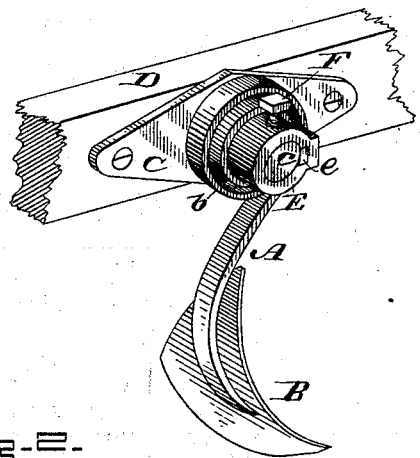
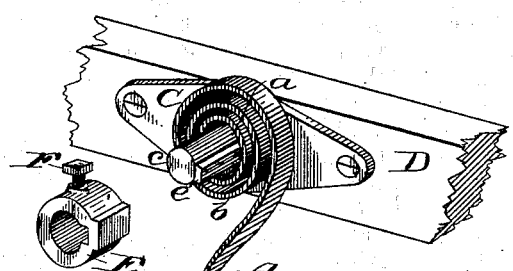
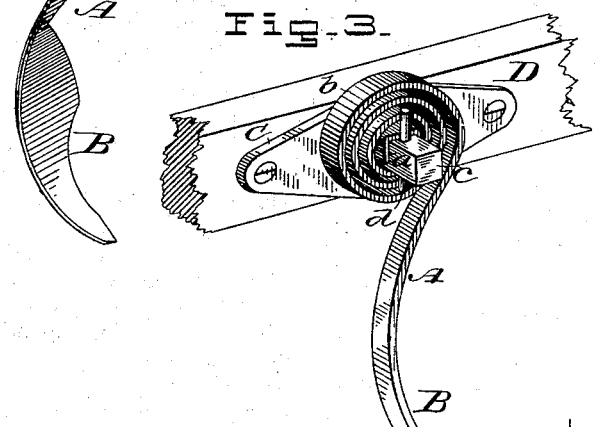
WITNESSES:
INVENTOR:

UNITED STATES PATENT OFFICE.

NILS NILSON, OF MAPLE PLAIN, MINNESOTA.

SPRING-TOOTH FOR AGRICULTURAL IMPLEMENTS.

SPECIFICATION forming part of Letters Patent No. 280,072, dated June 26, 1883.

Application filed July 14, 1882. (Model.)

*To all whom it may concern:*

Be it known that I, NILS NILSON, of Maple Plain, in the county of Hennepin and State of Minnesota, have invented certain Improvements in Spring-Teeth for Agricultural Implements, of which the following is a specification.

My invention relates to spring-teeth for cultivators, harrows, shovel-plows, and like implements; and it consists in coiling the shank or standard into spiral or volute form to produce a spring, and providing said shank with means of attachment to the beam, drag-bar, or frame, as hereinafter more fully set forth.

In the accompanying drawings, Figure 1 represents a perspective view of my improved spring-tooth; Fig. 2, a similar view with the fastening-collar removed, and Fig. 3 a perspective view of a modified form of the tooth.

The object of my invention is to produce a spring-tooth for use in harrows, cultivators, shovel-plows, and like instruments, which shall yield when meeting with an obstruction that might otherwise injure the tooth, and which shall automatically return to its operative position after the obstruction is passed.

To this end the shank of the tooth A is made of metal, preferably, though not necessarily, a flat strip, and is formed with an eye, $a$, of circular or polygonal form, at its upper end, and is then coiled in the form of a spiral or volute, $b$, around said eye, forming a strong and highly-elastic spring. The opposite or lower end of the shank is fashioned into or provided with a shovel, point, or tooth, B, of any desired form, according to the character of work to be performed. The tooth thus formed has its eye slipped upon an arbor or stem, $c$, projecting from the side of a plate, C, secured to the side of the drag bar or beam D, said arbor or stem being made of a form to fit the eye, as indicated.

When a polygonal eye is used, as in Fig. 3, and the arbor or stem $c$ made of corresponding form, a pin, $d$, may be passed through the arbor or stem, outside of the spring, to retain the shank or tooth in place; but I prefer to construct the parts as indicated in Figs. 1 and 2, for the reason that such construction permits any desired adjustment of the teeth to be made. By referring to said figures it will be seen that the arbor $c$ and eye $a$ are both made of circular form, so that the tooth may turn upon said arbor or stem when it is desired to adjust it. The inner coil of the spring is, however, formed with a laterally-projecting ear or extension, $e$, which extends past the side of the coil to or nearly to the outer end of the arbor or stem $c$, upon which it lies. A collar, E, is provided, having a central opening of proper size and form to fit over the arbor or stem and the ear or extension $e$ lying thereon, as shown in Fig. 1, said collar being furnished with a set-screw, F, by which it is made fast to the arbor or stem. It will be seen that by this arrangement the set-screw is made both to prevent the tooth from being slipped off over the end of the arbor or stem $c$ and to prevent rotation thereon. It will also be seen that by regulating the pressure of the screw it can be made to act as a friction device to yield at a given pressure and permit the tooth to rotate upon its arbor, thus preventing any possible injury to the same. This is especially desirable in the case of shovel-plows and cultivators, because of the greater strains to which they are subjected, while for harrow-teeth the form shown in Fig. 3 may be used to advantage. Either form may, however, be used for any of the implements mentioned.

The friction device, it will be seen, is not only the equivalent of the other form, but is something more than the equivalent, since it permits of adjustment and other manipulations that cannot be accomplished with the other.

I am aware that a volute spring having a central eye to fit upon a supporting-arbor has been connected by a link with a pivoted drill-tooth; that the end of a tooth has been coiled to form a spring, and that a spring-tooth has been made fast to a friction-band, and the latter secured upon a rock-shaft by a tightening-nut, and such constructions I do not claim.

Having thus described my invention, what I claim is—

In combination with the cylindrical arbor $c$, the spring-shank A, having eye $a$ and ear $e$, and the collar E, provided with set-screw F, and fitting over the arbor and the ear, substantially as shown and described.

NILS NILSON.

Witnesses:
B. F. CHRISTLIEB,
JOS. H. LYDEARD.